United States Patent [19]

Yamano

[11] 3,771,358

[45] Nov. 13, 1973

[54] TORQUE MEASURING APPARATUS

[75] Inventor: Yuzo Yamano, Kawasaki-shi, Kanagawa-ken, Japan

[73] Assignee: Sony Corporation, Tokyo, Japan

[22] Filed: May 23, 1972

[21] Appl. No.: 256,177

Related U.S. Application Data

[63] Continuation-in-part of Ser. No. 120,892, March 4, 1971, abandoned.

[52] U.S. Cl. ................................. 73/134, 73/136 A
[51] Int. Cl. .............................................. G01l 3/00
[58] Field of Search ...................... 73/1 R, 1 C, 134, 73/136 R, 136 A, 136 B, 136 C, 143

[56] References Cited
UNITED STATES PATENTS

| | | | |
|---|---|---|---|
| 2,133,763 | 10/1938 | Williams | 73/143 |
| 3,085,427 | 4/1963 | Martin | 73/136 A |
| 3,298,223 | 1/1967 | Dyer, Jr | 73/136 R X |

FOREIGN PATENTS OR APPLICATIONS

| | | | |
|---|---|---|---|
| 1,919,371 | 12/1970 | Germany | 73/143 |
| 1,146,836 | 3/1969 | Great Britain | 73/136 A |

Primary Examiner—Charles A. Ruehl
Attorney—Lewis H. Eslinger et al.

[57] ABSTRACT

A torque measuring apparatus is adapted to take the place of a tape cassette in a magnetic tape recorder and comprises a housing having apertures adapted to receive the reel shafts of the magnetic tape recorder, an inner ring member rotatable around at least one of the apertures for rotatable coupling with the reel shaft extending into that aperture, an outer ring member rotatable around the inner ring member, spring means connecting the inner and outer ring members and yieldably constraining said ring members to rotate together while rotation of the outer ring member with the inner ring member is resisted, and indicator means responsive to relative rotational movement of the inner and outer ring members to indicate the torque exerted on the tape by the recorder. Rotation of the outer ring member with the inner ring member may be resisted by a tape engaged with the outer ring member and the capstan of the tape recorder, or by springs connected between the outer ring member and the housing.

14 Claims, 11 Drawing Figures

PATENTED NOV 13 1973 3,771,358

INVENTOR.
YUZO YAMANO
BY
Lewis H. Eslinger

INVENTOR.
YUZO YAMANO

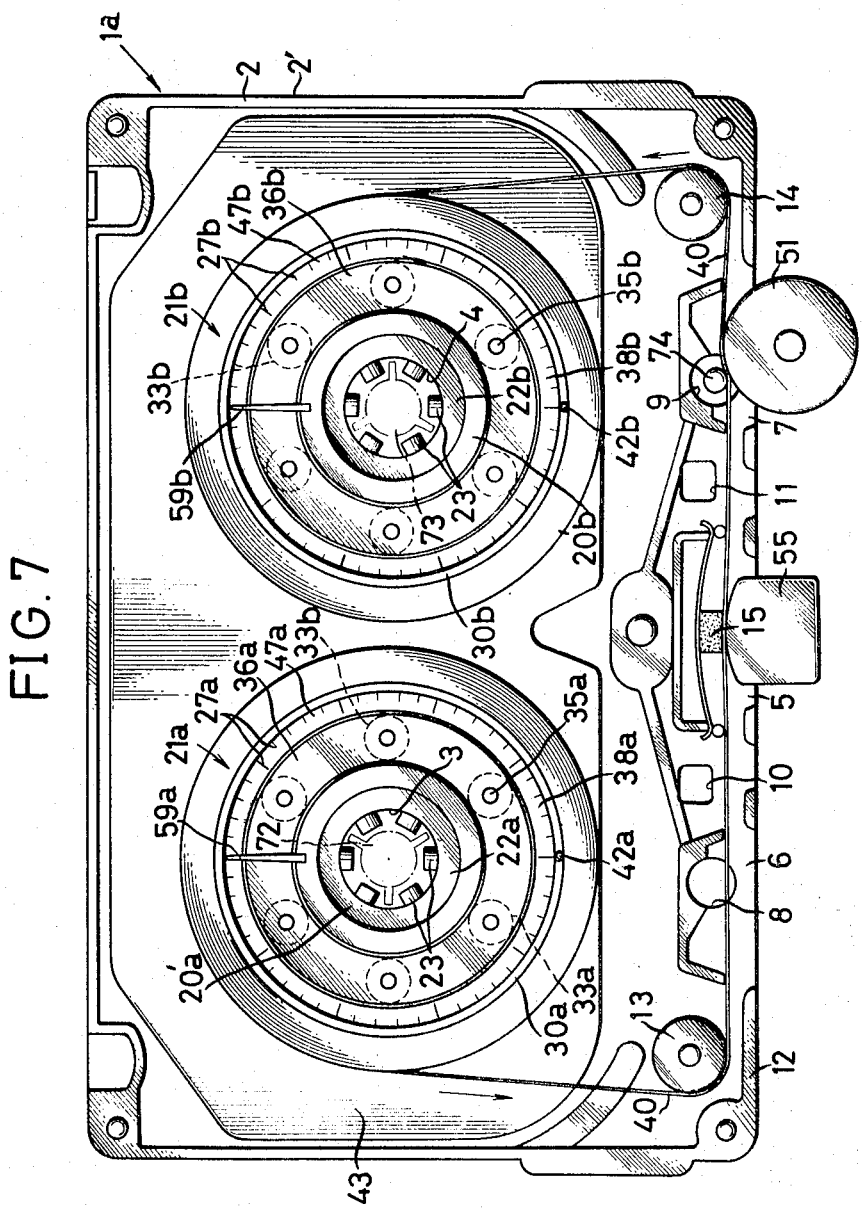

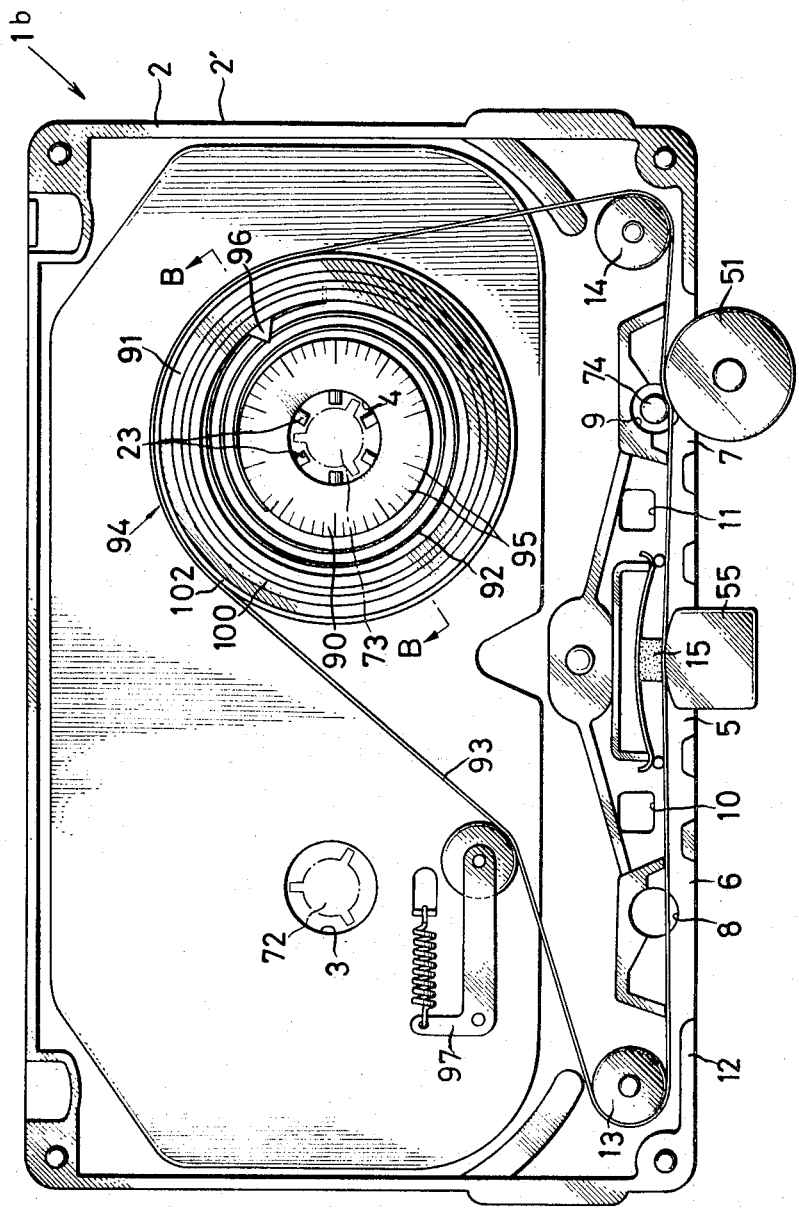

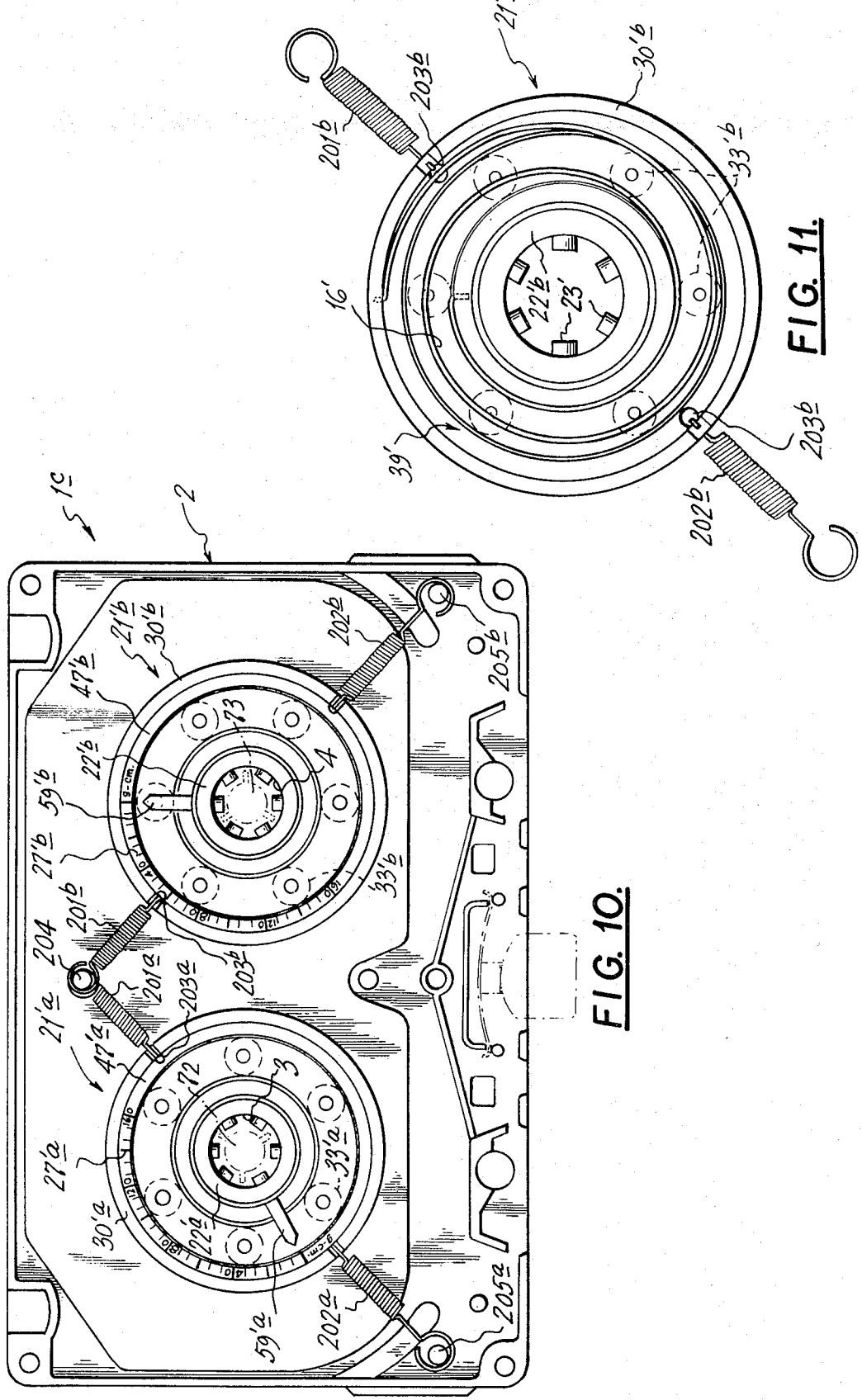

TORQUE MEASURING APPARATUS

This application is a continuation-in-part of my pending U.S. Patent Application Ser. No. 120,892, filed Mar. 4, 1971, and having a common assignee herewith, now abandoned.

This invention relates to a torque measuring apparatus and more particularly is directed to an apparatus for measuring and indicating the torque produced by magnetic tape recorders.

In magnetic tape recorders, the magnetic tape is wound on, and extends between supply and take-up reels which are suitably engaged with respective reel shafts, and the latter are selectively rotated to wind the tape onto the take-up reel from the supply reel or to rewind the tape on the supply reel. During recording and/or reproducing operations of such magnetic tape recorders, the tape between the reels is further engaged by the driven capstan which moves the tape past the recording and/or reproducing head, and the take-up reel is rotated to wind the tape thereon while a frictional drag is imposed on the supply reel to ensure that a suitable tension is applied to the tape. Accordingly, it is desirable to measure the dynamic torque, that is the torque exerted by the take-up reel shaft to wind up the tape on the take-up reel during the driving or propelling of the tape by the capstan, and also to measure the frictional drag torque on the supply reel during the propelling of the tape by the capstan. Further, when the magnetic tape recorder is in its fast forward or rewinding mode of operation, the tape is free of the capstan and it is then particularly desirable to measure the torque that can be exerted by either the take-up or supply reel shaft.

Heretofore, only hand-held instruments have been available for measuring torque and it has been difficult to obtain accurate measurements with the hand-held instruments, particularly in the case of torque measurements to be made under dynamic or operating conditions. Further, in the case of cassette type magnetic tape recorders, the existing torque measuring instruments are not readily insertable into the cavities or holders provided for receiving the standard cassettes and thus cannot be engaged with the reel shafts.

Accordingly, it is an object of this invention to provide a torque measuring apparatus particularly applicable to magnetic tape rcorders and in which the above described problems are overcome.

Another object is to provide an indicator means in a torque measuring apparatus to indicate dynamic torque of a magnetic tape recorder.

A further object is to provide a torque measuring apparatus for indicating both winding up torque and back tension torque in a magnetic tape recorder.

It is still another object of this invention to provide a torque measuring apparatus which is designed to replace a conventional cassette in a cassette type magnetic tape recorder.

It is still a further object of this invention to provide a miniaturized, easy-to-handle torque measuring apparatus.

In accordance with an aspect of this invention, a torque measuring apparatus includes a housing, preferably shaped similarly to that of a conventional tape cassette so as to be interchangeable with the latter, and having apertures to receive the reel shafts of a tape recorder, inner and outer ring members rotatable around at least one of the apertures and connected to each other by a spring with the inner ring member being rotatably coupled to the reel shaft received in the respective aperture while rotation of the outer ring member is resisted, for example by a spring connected to the housing, or by a tape engaged with the outer ring member to be driven in response to rotation of the latter and also engageable with the capstan of the tape recorder upon operation of the latter, and indicator means responsive to relative turning of the inner and outer ring members to indicate the torque exerted on the tape through the coupled reel shaft under operating conditions.

The above, and further objects, features and advantages of this invention, will appear from a reading of the following detailed description of illustrative embodiments of the invention which is to be read in conjunction with the accompanying drawings, wherein:

FIG. 7 is a view similar to that of FIG. 3, but showing another embodiment of torque measuring apparatus in accordance with this invention;

FIG. 8 is a view similar to that of FIG. 3, but showing still another embodiment of torque measuring apparatus in accordance with this invention;

FIG. 10 is still another view similar to that of FIG. 3, but showing a further embodiment of torque measuring apparatus according to this invention; and FIG. 11 is an enlarged, bottom plan view of a subassembly included in the apparatus of FIG. 10.

Figure 1:
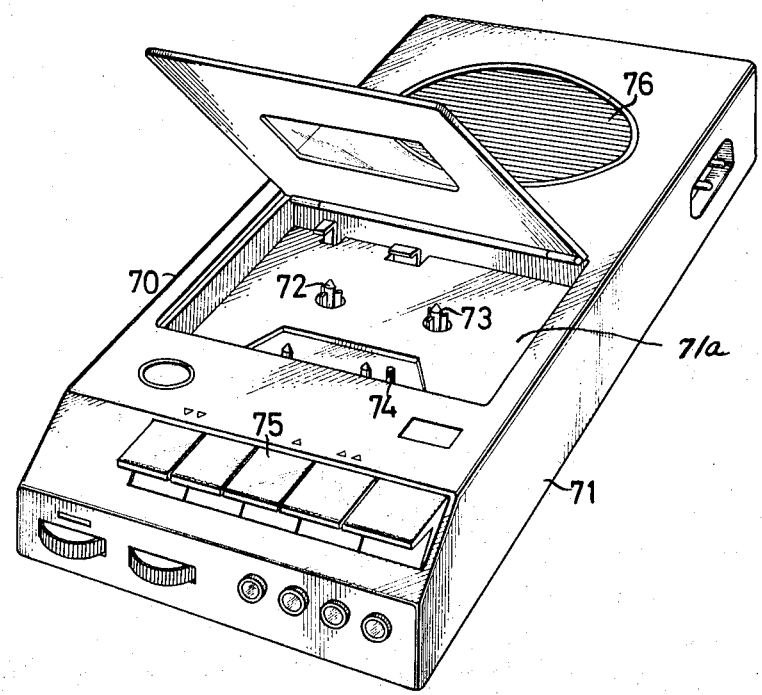
FIG. 1 is a perspective view of a cassette type magnetic tape recorder to which a torque measuring apparatus according to this invention may be applied.

Referring to the drawings in detail, and initially to FIG. 1, it will be seen that a widely used cassette type magnetic tape recorder 70 to which this invention is applicable comprises a housing 71 containing a magnetic tape drive mechanism (not shown) to drive a pair of reel shafts 72 and 73 and a capstan 74 which extend into a cavity or recess 71a provided in housing 71 to receive and act as a holder for a tape cassette. The housing 71 further contains a control button unit 75 to control the drive mechanism, for example, to cause the latter to selectively propel a magnetic tape in a forward or rewind direction, and further to control electric circuits (not shown) by which audio signals are selectively recorded or reproduced on the tape. A loudspeaker 76 is also provided for the audible reproduction of the recorded signals.

Figure 2:
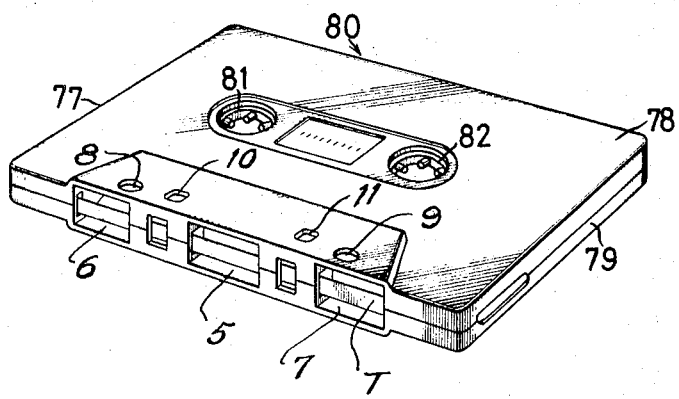
FIG. 2 is a perspective view of a conventional tape cassette for the recorder of FIG. 1.

As shown on FIG. 2, a cassette 77 suitable for use in the conventional tape recorder 70 may be of the so-called Philips-type. Such cassette 77 is shown to include a housing 80 consisting of upper and lower sections 78 and 79 that are symmetrically formed and rotatably contain a pair of reel hubs 81 and 82 engageable with shafts 72 and 73 of recorder 70 when cassette 77 is inserted in cavity 71a. The housing 80 of a conventional cassette 77 further has an aperture 5 through which a magnetic head (not shown) can extend to engage the magnetic tape T, a pair of apertures 6 and 7 located at opposite sides of the aperture 5, and adapted to selectively receive a pinch roller (not shown), a pair of openings 8 and 9 disposed adjacent apertures 6 and 7, respectively, and adapted to selectively receive the capstan 74 of the tape recorder, and a pair of guide pin receiving apertures 10 and 11.

Figure 3:
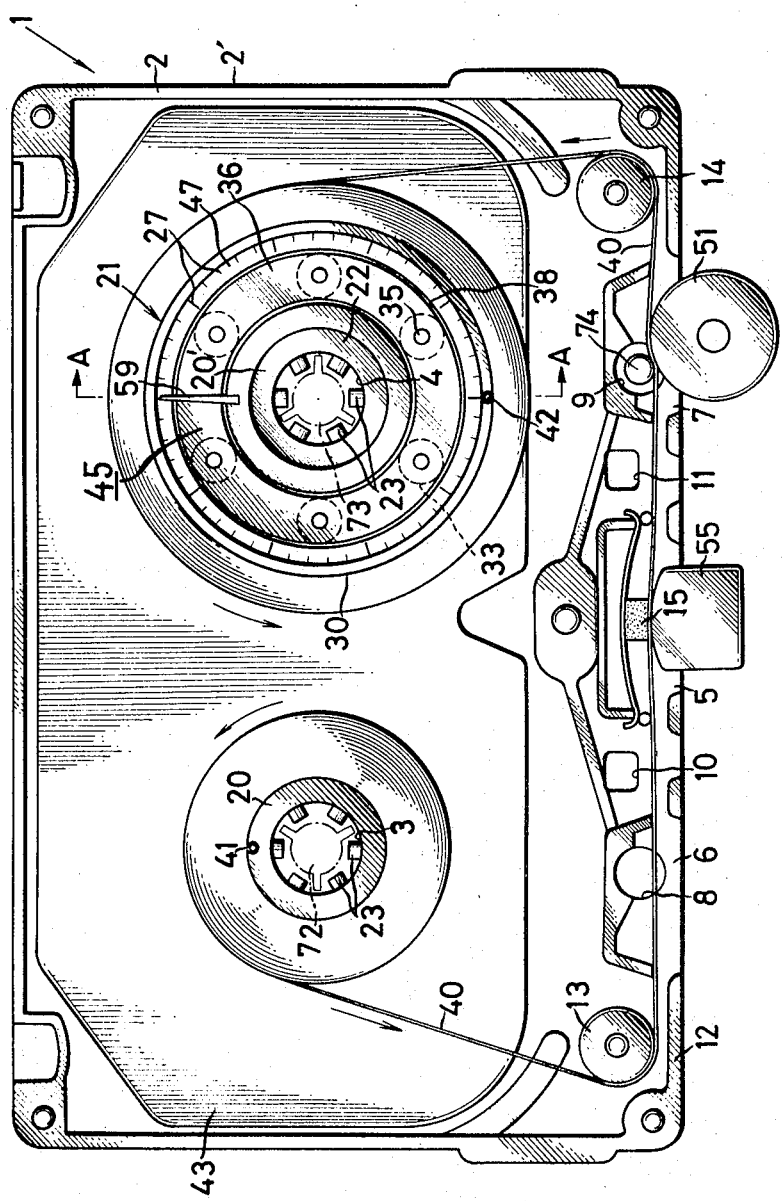
FIG. 3 is a top plan view of one embodiment of torque measuring apparatus in accordance with this invention shown with the upper part of its housing removed.
Figure 4:
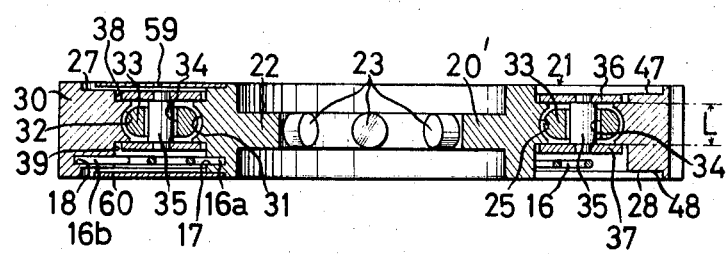
FIG. 4 is an enlarged sectional view taken on the line A—A on FIG. 3.
Figure 5:
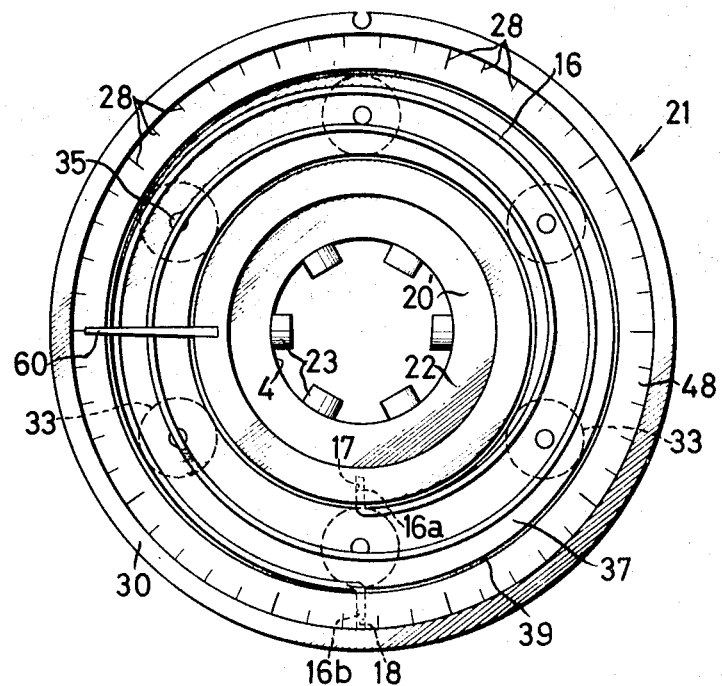
FIG. 5 is a top plan view of the portion of the apparatus appearing on FIG. 4.
Figure 6:
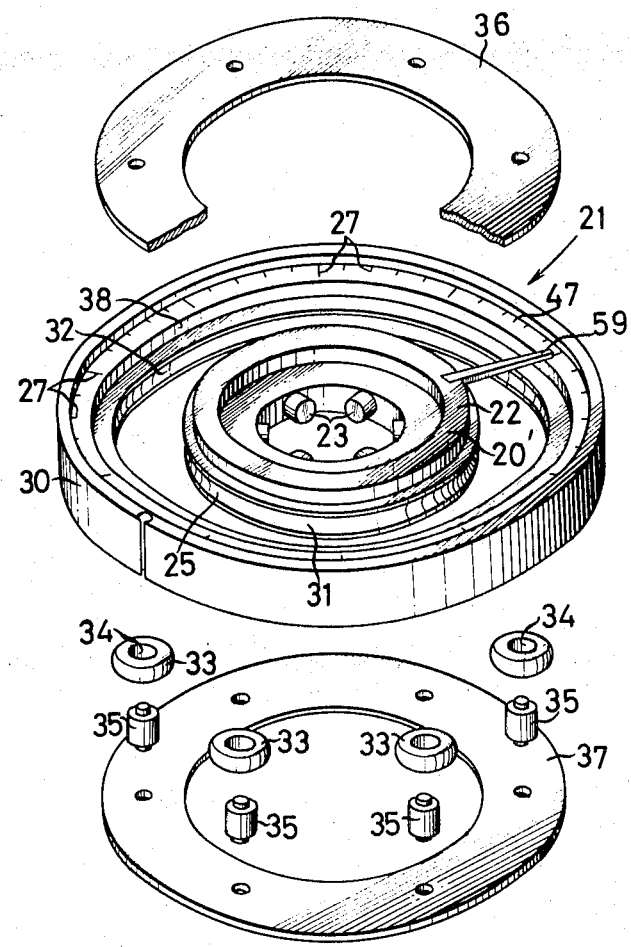
FIG. 6 is an exploded perspective view of the portion of the apparatus shown on FIGS. 4 and 5.

A torque measuring apparatus 1 in accordance with this invention, as shown on FIGS. 3–6, is intended to be used in tape recorder 70 in place of the conventional cassette 77. Accordingly, apparatus 1 is shown to have a housing 2 of transparent plastic which is given a configuration similar to that of the housing 80 of the conventional cassette 77 shown on FIG. 2. Thus, housing 2 is provided with a pair of spaced apertures 3 and 4 to receive the reel shafts 72 and 73 of the tape recorder, and with the apertures 5,6,7,8,9,10 and 11 for the same purposes as have been described with respect to such apertures in the conventional cassette 77. Further, as shown on FIG. 3, guide rollers 13 and 14 are rotatably mounted within housing 2 adjacent the opposite ends of the front wall 12 of the housing, and a tape back-up pad 15 is resiliently mounted within the housing adjacent the aperture 5 for receiving a magnetic head indicated at 55 on FIG. 3. In FIG. 3, only the lower section 2' of the housing 2 is illustrated, but it will be understood that the housing includes a similar upper section so as to enclose the structure shown on FIG. 3.

A reel hub 20 similar to the reel hubs 81 and 82 provided in the conventional cassette 77 is rotatably mounted within housing 2 adjacent one of the reel shaft receiving apertures 3 and 4, for example, at the aperture 3 as shown. The rotatable mounting of such reel hub 20 may be effected by providing flanges (not shown) around aperture 3 in the upper and lower sections of housing 2, which flanges engage loosely in circular recesses provided in the upper and lower faces of reel hub 20. In accordance with this invention, at the location of the other reel shaft receiving aperture 4 there is provided a torque indicator assembly 21.

Such assembly 21 is shown to comprise inner and outer concentric rings 22 and 30 which may be formed of a synthetic resin. The inner ring 22 has a reel hub portion 20' which is similar to the conventional reel hub 20 and is similarly mounted for rotation adjacent aperture 4. The reel hub portion 20' has the usual inwardly directed projections 23 for engagement with a reel shaft, for example, the shaft 73 indicated in broken lines on FIG. 3, extending into aperture 4. The outer and inner peripheral surfaces, respectively, of inner and outer rings 22 and 30 are formed with annular grooves 31 and 32 which are of substantially semicircular cross-section, as shown on FIG. 4, and which combine to define an annular track or guideway 25 between rings 22 and 30. A plurality of antifriction rolling members 33, which may be in the form of rollers with rounded edges, as shown, or balls, and which may be made of metal or synthetic resin, are disposed in track 25 and have their peripheries in rolling engagement with the similarly shaped grooves 31 and 32. Each antifirction member 33, as shown, is of substantially flat-elliptical cross-section and has a bore 34 extending through its center and receiving a shaft 35. By reason of the correspondence of the cross-sectional shape of the members 33 at their peripheries with the cross-section of grooves 31 and 32, it will be apparent that each member 33 will rotate about its shaft 35 in response to relative rotation of the rings 22 and 30.

The ends of the shafts 35 are secured in circular retaining plates 36 and 37 which respectively seat in annular recesses 38 and 39 defined at the top and bottom, respectively, of rings 22 and 30. Such retaining plates 36 and 37 are wider than the track 25 at the top and bottom of the latter so that the retaining plates will span the annular gap between the inner and outer rings. The distance L (FIG. 4) between the faces of recesses 38 and 39 which receive retaining plates 36 and 37 is only very slightly less than the distance between plates 36 and 37 as determined by shafts 35 so that the retaining plates 36 and 37 will almost contact the faces of the respective recesses 38 and 39 and thereby be held in predetermined positions with respect to the inner and outer rings 22 and 30.

Spring means 16 which, in the illustrated embodiment, is in the form of a spiral hair spring is located in annular recess 39 below retaining plate 37. The opposite ends 16a and 16b of the spring 16 extend into radial bores 17 and 18, respectively, formed in the inner ring 22 and the outer ring 30, whereby spring 16 yieldably connects the inner and outer rings 22 and 30.

Dial surfaces 47 and 48 extend radially outward from recesses 38 and 39 at the top and bottom, respectively, of outer ring 30, and suitable torque indicating scales 27 and 28 (FIGS. 5 and 6) are provided on such dial surfaces 47 and 48, respectively. Pointers 59 and 60, preferably of metal, are fixed to the top and bottom, respectively, of inner ring 22 and extend radially outward therefrom to cooperate with the scales 27 and 28, respectively, for indicating the developed torque.

An elongated tape 40 (FIG. 3) for example, an ordinary magnetic recording tape, is also provided within housing 2 and has its opposite ends suitably secured to reel hub 20 and to outer ring 30, respectively. As shown, the attachment of the ends of tape 40 to reel hub 20 and outer ring 30 may be effected by pins 41 and 42 which engage slidably in slots of substantially circular cross-section extending axially in the outer peripheral surfaces of hub 20 and ring 30. As shown, the tape 40 is wound on hub 20 and outer ring 30 and therebetween passes around guide rollers 13 and 14 so that a run of the tape passes along the front wall of the cassette housing past apertures 5–9, as in a conventional tape cassette. If desired, sheets 43 of a transparent anti-friction material may be provided within housing 2 above and below hub 2 and torque indicating assembly 21 to smooth the movement of the tape therebetween.

In using the above described torque measuring apparatus 1, such apparatus is merely inserted in the recess 71a of the cassette type tape recorder 70 in place of, and in the same way as the ordinary tape cassette 77. When measuring the winding-up torque, that is, the pull exerted on the tape due to the rotation of reel shaft 73 during either normal forwarding of the tape for recording or reproducing or during fast forwarding of the tape, the housing 2 of the apparatus 1 is placed in recess or cavity 71a so that shaft 73 will be received in aperture 4 and shaft 72 will be received in aperture 3, as shown on FIG. 3. With the shafts 72 and 73 thus received in apertures 3 and 4, shaft 72 is rotatably coupled with reel hub 20 and shaft 73 is rotatably coupled with the reel hub portion 20' of the inner ring 22 of torque indicator assembly 21.

With the apparatus 1 thus installed on the tape recorder 70, with the control button unit 75 is manually actuated to cause either normal forwarding operation, as during recording or reproducing, or fast forward operation. In the case of normal forwarding operation for either recording or reproducing, the recording and reproducing head 55 is displaced toward the tape back-up pad 15 and the pinch roller 51 is moved through the aperture 7 to engage the tape between the surface of pinch roller 51 and capstan 74 received in opening 9. Thus, tape 40 is propelled by the cooperative action of the capstan and pinch roller in the direction of the arrows on FIG. 3 and, at the same time, the coupling of shaft 73 with reel hub portion 20' of inner ring 22 and the yieldable connection of the latter to outer ring 30 causes rotation of the latter in the counter-clockwise direction for winding up the tape on outer ring 30. Such rotation of outer ring 30 produces a tension in the tape 40 between capstan 74 and the windings of the tape on outer ring 30, which tension corresponds to the torque exerted by reel shaft 73, and the tension in the tape as a result of that winding-up torque causes flexing of spring 16 and resulting relative turning of the inner and outer rings 22 and 30. The extent of such relative turning of inner and outer rings 22 and 30 is indicated by the cooperation of pointer 59 with scale 27 which may be calibrated to directly show the winding-up torque.

When it is desired to measure the rewinding torque of the magnetic tape recorder 70, the position of housing 2 in cavity 71a is reversed, that is, the housing 2 of apparatus 1 is turned upside down so that reel shaft 72 will be received in aperture 4 and reel shaft 73 will be received in aperture 3. With the apparatus 1 thus arranged in recess or cavity 71a, the control button unit 75 is actuated to effect rewinding operation of the recorder and shaft 72 is driven in the clockwise direction to similarly drive the inner ring member 22 coupled therewith. The tension or drag on the tape then causes relative rotational movement of outer ring member 30 and inner ring member 22 and the extent of such relative rotational movement is indicated by the cooperation of pointer 60 with scale 28 which may be calibrated to directly show the rewinding torque. It should also be noted that, with the apparatus 1 arranged in cavity 71a in the manner last described, that is, with shafts 72 and 73 received in apertures 4 and 3, respectively, the torque indicator assembly 21 can be employed to indicate back tension, that is, the tension in tape 40 at the downstream side of head 55 during either normal forwarding or fast forwarding operation of the tape recorder. Further, if the tape recorder 70 is of a type which is capable of recording and reproducing in either the forward direction or the reverse direction of tape movement, the apparatus 1 may be disposed in cavity 71a to receive shafts 72 and 73 in apertures 4 and 3, respectively, for indicating the winding-up torque during reverse operation.

Referring now to FIG. 7, it will be seen that the torque measuring apparatus 1a according to this invention, as there shown, is generally similar to the apparatus 1 described above with reference to FIGS. 3-6. However, in the apparatus 1a, torque indicator assemblies 21a and 21b are associated with both apertures 3 and 4 of housing 2, with each of the assemblies 21a and 21b being generally similar to the single assembly 21 provided in the apparatus 1. The assemblies 21a and 21b have their several parts identified by the same reference numerals used in connection with the description of the corresponding parts of the assembly 21, but with the letters a and b respectively appended thereto. The assemblies 21a and 21b differ substantially from the previously described assembly 21 only in that the scale 28 and pointer 60 at the underside of assembly 21 is omitted from each of the assemblies 21a and 21b.

The torque measuring apparatus 1a is always arranged in cavity 71a of tape recorder 70 so that reel shaft 72 and 73 are respectively received in apertures 3 and 4, as shown on FIG. 7. When the tape recorder is operated to propel the tape 40 in the direction of the arrows on FIG. 7, for example, for recording or reproducing operations, the pointer 59a and scale 27a of assembly 21a indicate the back tension on the tape while the pointer 59b and scale 27b of assembly 21b indicate the winding-up torque. Thus, both dynamic torques or tensions are indicated simultaneously. It will also be apparent that the apparatus 1a makes it possible to measure the fast forward winding-up torque or the rewinding torque without altering the relationship of the apparatus 1a to the tape recorder.

In the apparatus 1 or 1a, as described above, a signal of a predetermined frequency, for example, 3KHz may be recorded on the magnetic tape 40 for reproduction by the magnetic head 55 so that a wow-flutter of the tape recorder can be detected with the apparatus 1 or 1a at the same time that such apparatus is being used for measuring the dynamic torque.

Figure 9:
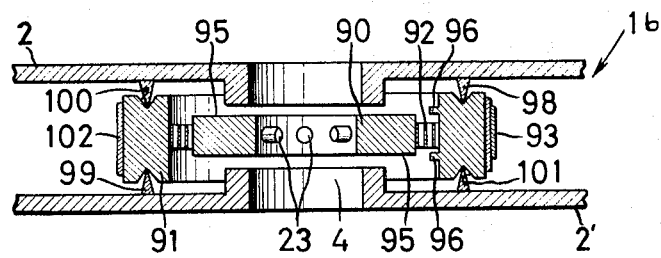
FIG. 9 is an enlarged sectional view taken on the line B—B on FIG. 8.

Referring now to FIGS. 8 and 9, it will be seen that a torque measuring apparatus 1b in accordance with still another embodiment of this invention includes a housing 2 similar to the previously described housing of apparatus 1, a torque indicator assembly 94 which is disposed within housing 2 in the vicinity of the aperture 4, a tape 93 which is, in this case, in the form of an endless loop, and a tensioning device 97 engaging the tape loop 93 between torque indicator assembly 94 and guide roller 13 so as to maintain a desired tension in the endless tape loop. The torque indicator assembly 94 once again includes an inner ring 90 having projections 23 for rotatably coupling the inner ring to a reel shaft, for example, the shaft 73 on FIG. 8, received in aperture 4, and an outer ring 91 which is concentric with inner ring 90 and connected to the latter by means of a spiral spring 92 located between the inner and outer rings. Circular flanges 98 and 99 extend from the upper and lower housing sections in concentric relation to aperture 4 and are received slidably in circular grooves 100 and 101 formed in the upper and lower surfaces of outer ring 91 for rotatably supporting the latter within the housing. Since the housing and at least ring 91 are preferably formed of a synthetic resin, the frictional resistance to turning of outer ring 91 is minimized, and such frictional resistance is further lessened by providing flanges 98 and 99 and grooves 100 and 101 with triangular cross-sections, as shown particularly on FIG. 9. The outer peripheral surface of ring 91 is preferably covered by a rubber sleeve 102 to increase the frictional resistance to relative slipping of the endless tape loop 93 with respect to outer ring 91. As shown, the tensioned endless tape loop 93 is wrapped around a substantial extent of the periphery of outer ring 91 and further extends around the guide rollers 13 and 14.

When apparatus 1b is placed in cavity 71a of tape recorder 70 and the latter is operated for recording or reproducing, the endless tape loop 93 is propelled at a predetermined speed by the cooperative action of capstan 74 and pinch roller 51. Simultaneously, the rotation of reel shaft 73 is transmitted to inner ring 90 and, by way of spiral spring 92, to outer ring 91. In order to take up the magnetic tape in the case of a conventional cassette, the rotational speed of shaft 73 is selected so that outer ring 91 tends to drive the tape loop 93 at a faster speed than that at which the tape is propelled by the capstan and pinch roller. Thus, spiral sprin 92 is flexed and the resulting relative rotation of rings 90 and 91 is indicated by the coaction of a scale 95 on the upwardly directed face of inner ring 90 with a pointer 96 extending from outer ring 91 above spring 92. Preferably, as indicated on FIG. 9, scales 95 are provided on the opposite faces of inner ring 90 and outer ring 91 is provided with individual pointers 96 for cooperation with both scales. Thus, as in the case of the apparatus 1 described with reference to FIGS. 3–6, the apparatus 1b can be reversed in its arrangement within cavity 71a of the tape recorder, fo example, to receive shaft 72 in aperture 4, in which case the apparatus 1b will indicate either a rewinding torque or a back tension during normal operation.

It will be apparent that, with all of the above described embodiments of this invention, it is possible to accurately measure dynamic torque of a tape recorder during actual propelling of the tape, and thereby to ascertain the functional condition of the tape propelling system of a cassette type tape recorder during operation of the latter.

Referring now to FIGS. 10 and 11, it will be seen that, in accordance with still another embodiment of this invention as there illustrated, a torque measuring apparatus 1c is generally similar to the apparatus 1a of FIG. 7 and comprises a similar housing 2 adapted to be received in cavity 71a of tape recorder 80 in place of the usual cassette and having apertures 3 and 4 into which the reel shafts 72 and 73 (shown in broken lines on FIG. 10) can project. The apparatus 1c is shown to have two torque indicator assemblies 21'a and 21'b associated with the apertures 3 and 4, respectively, of the housing, and being generally similar to the assemblies 21a and 21b of apparatus 1a. On FIGS. 10 and 11, the various parts of assemblies 21'a and 21'b are identified by the same reference numerals employed in respect to the corresponding parts of assemblies 21a and 21b, but with a prime being appended to each numeral.

The apparatus 1c is substantially distinguished from the previously described apparatus 1a only in that the tape 40 of the latter is omitted, and rotation of the outer rings 30'a and 30'b with the respective inner rings 22'a and 22'b is otherwise resisted, preferably by spring means connected between such outer rings 30'a and 30'b and the housing 2. For example, as shown, helical tension springs 201a and 202a may be anchored, at one end, in holes 203a provided in outer ring 30'a at diametrically opposed locations thereon, while the other ends of springs 201a and 202a are secured on posts 204 and 205a which may be molded parts of housing 2 and which may be respectively located midway between apertures 3 and 4 adjacent one longitudinal edge of housing 2 and adjacent an end of the opposite longitudinal edge. Similarly, helical tension springs 201b and 202b extend from diametrically opposed holes 203b in outer ring 30'b to post 204 and 50 a post 205b.

In erasing the torque measuring apparatus 1c, such apparatus is merely inserted in the recess or cavity 71a of the cassette type tape recorder 70 in place of, and in the same way as the ordinary cassette, so that the reel shafts 72 and 73 project into apertures 3 and 4 and are rotatably coupled with the inner rings 22'a and 33'b by means of the projections 23' on such rings. When the control button unit 75 of the tape recorder is actuated to select either normal forwarding operation, as during recording or reproducing, or fast forward operation, the drive of the tape recorder tends to rotate reel shaft 73, and hence inner ring 22'b, in the counterclockwise direction as viewed on FIG. 10. The spring 16' (FIG. 11) constrains the outer ring 30'b to rotate with the respective inner ring 22'b, and rotation of outer ring 30'b is yieldably resisted by springs 201b and 202b. Thus, rotation of reel shaft 73 is yieldably resisted and the static drive torque available at shaft 73 will determine the extent of the angular or rotational displacement of inner ring 22'b relative to outer ring 30'b. Similarly when control button unit 75 of the tape recorder is actuated to select the fast rewind operation, the static drive torque then available at shaft 72 will determine the extent of the angular or rotational displacement of inner ring 22'a relative to outer ring 30'a. Thus, the pointer 59'a and 27'a of torque indicator assembly 21'a and the pointer 59'b and scale 27'b of assembly 21'b can indicate the static torques available at shafts 72 and 73 for the drive of tape reel engaged therewith.

Since the torque measuring apparatus according to each of the above described embodiments of this invention is merely installed in the tape recorder in place of a conventional tape cassette, the desired torque measurements can be effected accurately without the exercise of skill, as is required in the use of the conventional instruments previously provided for measuring torque.

It also should be noted that, in the case of the apparatus 1, 1a or 1c according to this invention, the relative rotational movements of the inner and outer rings 22 and 30 which indicate the torque being measured are yieldably resisted by a hair spring 16 or 16' so that even a small torque results in a large relative movement to make possible very accurate measurements. Further, in apparatus 1, 1a or 1b anti-friction rolling members 33 or 33' are employed for mounting the outer ring 30 for rotation relative to the inner ring 22, so that the relative rotation of the inner and outer rings is effected smoothly and with imperceptible frictional resistance to disturb the accuracy of the torque measurements.

Although illustrative embodiments of this invention have been described in detail herein with reference to the accompanying drawings, it is to be understood that this invention is not limited to those precise embodiments and that various changes and modifications may be effected therein by one skilled in the art without departing from the scope or spirit of the invention.

What is claimed is:

1. A torque measuring apparatus interchangeable with a cassette of a cassette type magnetic tape recorder having two selectively rotated reel shafts and a tape drive capstan extending into a cassette-receiving holder; said apparatus comprising a housing adapted to be received by said holder and having two apertures and an opening adapted to receive said reel shafts and capstan, respectively, of the tape recorder, inner and outer ring members arranged concentrically within said housing around one of said apertures, means on said inner ring member for rotatably coupling the latter with a reel shaft received in said one aperture, spring means connecting said inner and outer ring members and yieldably constraining said ring members to rotate together, means in said housing for resisting rotation of said outer ring member with said inner ring member, and indicator means responsive to relative rotational movements of said inner and outer ring members to indicate a torque exerted by the recorder on said reel shaft received in said one aperture.

2. A torque measuring apparatus according to claim 1, in which said means for resisting rotation of said outer ring member with said inner ring member includes a tape in said housing engageable by the capstan when the latter is received in said opening and being engaged with said outer ring member.

3. A torque measuring apparatus according to claim 2, further comprising a reel hub in said housing around the other of said apertures and carrying means for rotatably coupling with said reel hub to a reel shaft received in said other aperture, and in which said tape is wound on said outer ring member and said reel hub and extends therebetween.

4. A torque measuring apparatus according to claim 2, further comprising second inner and outer ring members arranged concentrically within said housing around the other of said apertures with means on said second inner ring member for rotatably coupling the latter to a reel shaft received in said other aperture, spring means yieldably constraining said second ring members to rotate together, and second indicator means responsive to relative rotational movements of said second ring members, and in which said tape is wound on the first mentioned outer ring member and said second outer ring member and extends therebetween.

5. A torque measuring apparatus according to claim 2, in which said tape is a magnetic medium.

6. A torque measuring apparatus according to claim 5, in which a signal of predetermined frequency is recorded on said magnetic medium.

7. A torque measuring apparatus according to claim 2, in which said tape is an endless loop wrapped on at least a portion of the peripheral surface of said outer ring member.

8. A torque measuring apparatus according to claim 7, in which said housing contains tensioning means engaging the endless tape loop to ensure close engagement thereof with said outer ring member.

9. A torque measuring apparatus according to claim 1, wherein said indicator means includes at least one scale provided on one of said ring members and at least one pointer provided on the other of said ring members and cooperating with said one scale.

10. A torque measuring apparatus according to claim 1, in which said indicator means provides a visual indication of said torque at the opposite sides of said housing.

11. A torque measuring apparatus according to claim 1, in which said housing is reversible on the tape recorder so as to engage said inner ring member with one or the other of the reel shafts, and said indicator means includes scales on opposite sides of one of said ring members, and pointers extending from the opposite sides of the other of said ring members and cooperating with said scales on the respective sides of said one ring member.

12. A torque measuring apparatus according to claim 1, in which said inner and outer ring members define a race therebetween, and rolling bearing members are located in said race to support said outer ring member from said inner ring member.

13. A torque measuring apparatus according to claim 1, in which said means for resisting rotation of said outer ring member with said inner ring member includes spring means connected between said housing and said outer ring member.

14. A torque measuring apparatus according to claim 1, further comprising second inner and outer ring members arranged concentrically within said housing around the other of said apertures with means on said second inner ring member for rotatably coupling the latter to a reel shaft received in said other aperture, spring means yieldably constraining said second ring members to rotate together, means for resisting rotation of said second outer ring member, and second indicator means responsive to relative rotational movements of said second ring members.

* * * * *